United States Patent [19]

Ogawa et al.

[11] 4,274,462
[45] Jun. 23, 1981

[54] PNEUMATIC TIRE HAVING AN IMPROVED RESISTANCE AGAINST HEAT BUILD-UP EMPLOYING SYNDIOTACTIC-1,2-POLYBUTADIENE FIBERS IN TREAD BASE RUBBER

[75] Inventors: Masaki Ogawa, Sayama; Tamio Araki, Musashino; Shinji Yamamoto, Ichihara, all of Japan

[73] Assignees: Bridgestone Tire Co., Ltd., Tokyo; Ube Industries, Ltd., Ube, both of Japan

[21] Appl. No.: 27,414

[22] Filed: Apr. 5, 1979

[30] Foreign Application Priority Data

Apr. 6, 1978 [JP] Japan .................................. 53-39677

[51] Int. Cl.³ .................... B60C 11/00; B60C 1/00; C08L 7/00
[52] U.S. Cl. ..................... 152/209 R; 152/330 R; 152/357 R; 152/374; 152/DIG. 4; 260/5; 260/42.32; 260/42.47; 260/762; 525/236
[58] Field of Search .......... 152/209 R, 330 R, 357 R, 152/374, DIG. 4; 260/5, 42.32, 42.47, 762; 525/236, 241

[56] References Cited

U.S. PATENT DOCUMENTS

| | | | |
|---|---|---|---|
| 3,759,306 | 9/1973 | Greiner et al. | 152/374 |
| 3,827,991 | 8/1974 | Ando et al. | 260/5 |
| 4,196,106 | 4/1980 | Matsuura et al. | 260/5 |
| 4,202,850 | 5/1980 | Yamamoto et al. | 260/5 X |

*Primary Examiner*—John T. Goolkasian
*Assistant Examiner*—Lois E. Rodgers
*Attorney, Agent, or Firm*—Sughrue, Rothwell, Mion, Zinn and Macpeak

[57] ABSTRACT

A pneumatic tire having a cap/base structured tread and having an improved resistance against heat build-up and an improved wear resistance at the end of the use can be obtained by forming a tread base rubber of the tire with a vulcanizate of a rubber composition comprising specifically limited amounts of short fibers of syndiotactic-1,2-polybutadiene having a maximum diameter of not more than $10\mu$ and an average diameter of less than $1\mu$, carbon black, sulfur and natural or synthetic rubber.

4 Claims, 3 Drawing Figures

PNEUMATIC TIRE HAVING AN IMPROVED RESISTANCE AGAINST HEAT BUILD-UP EMPLOYING SYNDIOTACTIC-1,2-POLYBUTADIENE FIBERS IN TREAD BASE RUBBER

BACKGROUND OF THE INVENTION (1) Field of the Invention

The present invention relates to a pneumatic tire having a cap/base structured tread and having a remarkably improved resistance against heat build-up. A vulcanizate of a rubber composition comprising short fibers of syndiotactic (hereinafter abbreviated as syn)-1,2-polybutadiene is used as the tread base rubber of the tire.

(2) Description of the Prior Art

There have been various investigations of the internal heat build-up of tire, and it is well known that among troubles caused by the internal heat build-up, a most serious problem occurs in the lower portion of tread, that is, in the tread base portion ranging from the center portion of tread crown to the tread shoulder portion. In a large-size tire, the tread, particularly the shoulder portion, is thick, and the temperature of the shoulder portion often exceeds 100° C. during the running due to the stresses and deformations repeatedly subjected to the tread. Therefore, a rubber having a low heat build-up, that is, a highly resilient rubber, is used as the tread base rubber of a cap/base structured tread, for example, as shown in FIGS. 1A, 1B and 1C. The rubber having a low heat build-up is produced at present by using a lower grade carbon black or by compounding a smaller amount of carbon black to a rubber. However, the tread base portion may be contacted with the road surface at the end of the use depending upon the structure of tire. Therefore, the tread base portion is required to have a high resistance against heat build-up and a high strength. However, a rubber composition capable of giving a vulcanizate having sufficiently high resistance against heat build-up and strength has not yet been developed. Accordingly, a pneumatic tire, which is low in the heat build-up and has a high wear resistance even at the end of the use, has not yet been obtained.

SUMMARY OF THE INVENTION

The object of the present invention is to solve the above described drawbacks of pneumatic tires.

The inventors have variously investigated, bearing in mind the fact that, when syn-1,2-polybutadiene short fibers are compounded to a rubber, the rubber is effectively reinforced and further has a high rebound resilience. As a result, the inventors have succeeded in providing a pneumatic tire having improved resistance against heat build-up and improved wear resistance even at the end of the use, and accomplished the present invention.

According to the present invention, there is provided a pneumatic tire having a cap/base structured tread and having an improved resistance against heat build-up, characterized by forming a tread base rubber of the tire with a vulcanizate, which has a rebound resilience value of at least 50% defined in JIS K6301, of a rubber composition comprising 3 to 40 parts by weight of short fibers of syn-1,2-polybutadiene having a maximum diameter of not more than $10\mu$ and an average diameter of less than $1\mu$, 20 to 100 parts by weight of carbon black and 0.2 to 2 parts by weight of sulfur, on a basis of 100 parts by weight of a rubber selected from natural rubbers, synthetic rubbers and blends thereof in an optional blending ratio.

DETAILED DESCRIPTION OF THE INVENTION

Figure 1A:
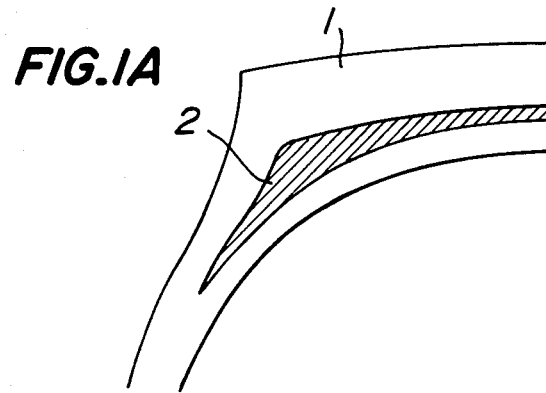
FIGS. 1A, 1B and 1C are cross-sectional views of a part of pneumatic tires having a cap/base structured tread, which show various locations of a tread base rubber formed of a vulcanizate of the rubber composition defined in the present invention.
Figure 1B:
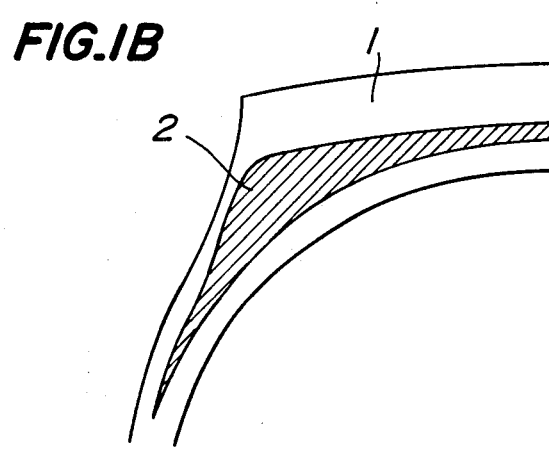
Figure 1C:
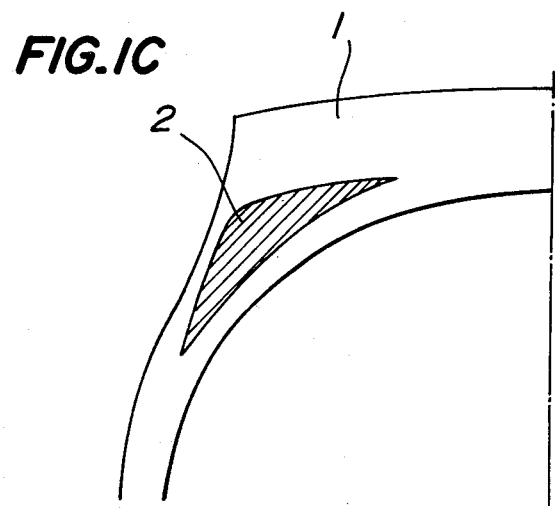

The feature of the present invention lies in the use of a vulcanizate of the above defined rubber composition as a tread base rubber 2 in a pneumatic tire having a cap/base structured tread 1, for example, shown in FIGS. 1A, 1B and 1C.

As the rubber to be contained in the rubber composition for the tread base rubber of the pneumatic tire according to the present invention, use may be made of natural rubbers, synthetic rubbers and blends thereof in an optional blending ratio. As the synthetic rubber, there are preferably used diene type synthetic rubbers such as polybutadiene rubber, styrene-butadiene copolymer rubber, ethylene-propylene-diene terpolymer rubber, polyisoprene rubber, butyl rubber and the like.

According to the present invention, short fibers of syn-1,2-polybutadiene to be compounded with the rubber have a maximum diameter of not more than $10\mu$ and an average diameter of less than $1\mu$. For example, the syn-1,2-polybutadiene short fibers are produced as follows: that is, syn-1,2-polybutadiene particles having a particle size of 10 to $700\mu$ are kneaded with unvulcanized rubber at a temperature below 190° C. and then the resulting mixture is extruded through a circular die having an inner diameter of 1 to 5 mm and a ratio of length to inner diameter of 1 to 20 at a temperature of at least 5° C. higher than the melting point of syn-1,2-polybutadiene. Next, the extruded product is cooled to room temperature and stretched by means of rolls at a roll temperature of 50 to 100° C., whereby short fibers of oriented syn-1,2-polybutadiene can be obtained as a masterbatch wherein these fibers are dispersed in the rubber. If it is intended to provide only the short fibers, the masterbatch may be treated with a solvent capable of dissolving only rubber, such as benzene or toluene. Moreover, a softener such as process oil, stearic acid, liquid rubber and the like, a reinforcer such as carbon black or a pigment may be added during the kneading.

Since the short fibers of syn-1,2-polybutadiene have a maximum diameter of not more than $10\mu$ and an average diameter of less than $1\mu$, then firmly adhere to rubber and prevent effectively the creeping of the rubber as explained later. As the result, the rubber compounded with the short fibers has sufficiently high rebound resilience and strength which cannot be attained by the use of conventional short fibers or inorganic fibers.

According to the present invention, the syn-1,2-polybutadiene short fibers are preferable to have a 1,2-structure unit content of not less than 80%. When the 1,2-structure unit content is less than 80%, the molecular regularity is low, so that the strength of the short fibers lowers and consequently the short fibers are cut at the stretching step. Thus, the short fibers having the 1,2-structure unit content of less than 80% cannot develop a sufficient reinforcing effect.

Further, the syn-1,2-polybutadiene short fibers are preferable to have a melting point of not less than 190° C. When the melting point is less than 190° C., the temperature dependence of the short fibers becomes large and hence the vulcanizate compounded with such short fibers has a large temperature dependence. Moreover, the syn-1,2-polybutadiene short fibers are preferable to have a length of not more than 10 mm, because when the length is more than 10 mm, the workability of the resulting rubber composition deteriorates too far.

According to the present invention, an amount of the syn-1,2-polybutadiene short fibers is 3 to 40 parts by weight, preferably 5 to 20 parts by weight based on 100 parts by weight of the rubber. When the amount of the short fibers is smaller than 3 parts by weight, the addition effect is less, while when the amount exceeds 40 parts by weight, the elasticity inherent to the rubber is lost.

In the rubber composition according to the present invention, carbon black is used in an amount of 20 to 100 parts by weight based on 100 parts by weight of the rubber. When the amount of carbon black is smaller than 20 parts by weight, the reinforcing effect is not satisfactorily obtained, while when the amount exceeds 100 parts by weight, the resistance of the vulcanizate against heat build-up is too low.

In the present invention, sulfur is used in an amount of 0.5 to 2 parts by weight based on 100 parts by weight of the rubber. When the amount of sulfur is smaller than 0.5 parts by weight, the wear resistance of the vulcanizate is poor, while when the amount exceeds 2 parts by weight, the rebound resilience of the vulcanizate becomes low and consequently the vulcanizate is poor in the resistance against heat build-up.

As mentioned above, the rubber composition to be used as the tread base rubber of the pneumatic tire according to the present invention is prepared by compounding the defined amount of the novel syn-1,2-polybutadiene short fibers together with the defined amounts of carbon black and sulfur into the rubber. Particularly, the adhesion of the syn-1,2-polybutadiene short fibers to the rubber after the vulcanization is very firm, so that the serious drawback of the conventional short fiber reinforced vulcanizate causing a large creep is prevented, and the vulcanizate has a high rebound resilience value of at least 50% defined in JIS K6301 and a high strength. Accordingly, the present invention can provide a pneumatic tire having a very low heat build-up and further having a remarkably excellent wear resistance at the end of the use by the use of the vulcanizate of the above described rubber composition as the tread base rubber of the tire.

Moreover, the pneumatic tire of the present invention includes bias type tires, belted bias type tires and radial type tires. In these tires, there may be used cords composed of natural or synthetic organic fiber, glass cords, metallic cords and the like.

The present invention will be described in greater detail with reference to the following examples and comparative examples.

EXAMPLES 1-3 AND COMPARATIVE EXAMPLES 1-2

Various rubber compositions having a compounding recipe as shown in the following Table 1 were prepared and a rebound resilience value thereof after the vulcanization was measured according to a rebound resilience test of JIS K6301. Next, a pneumatic radial type tire for bus and truck having a tire size of 1000R 20 and having a cap/base structured tread shown in FIG. 1C was manufactured by using the above rubber composition as a tread base rubber of the tire, and subjected to a durability test by drum in the following manner. That is, the tire was run on an iron drum until the tire was broken at the shoulder portion firstly at a speed of 50 km/hr for 3 hours, and then at an increasing speed of by 10 km/hr in every 3 hours under conditions of an internal pressure of the tire of 10 kg/cm² and a 100% load of the designed load for the common use (normal load), and the durability of the tire was estimated by the speed at the breakage.

The same kind of a tire as that used in the durability test by drum was buffed until the tread base portion was exposed to the tire surface, and then the tire was run over a distance of 20,000 km, and the wear loss of tire weight was measured by subtracting the tire weight after running from the tire weight before running and indicated in Table 1 as a wear resistance index expressed by the following equation:

$$\text{Wear resistance index} = \frac{\text{Wear loss in the tire of Example 1}}{\text{Wear loss in each tire other than the tire of Example 1}} \times 100$$

The obtained results are shown in Table 1.

The average diameter of the syn-1,2-polybutadiene short fibers was measured as follows: that is, a mixture consisting of the rubber and syn-1,2-polybutadiene short fibers obtained by extruding a blend of the rubber and syn-1,2-polybutadiene particles through a circular die with a diameter of 2 mm and a length of 10 mm was imbued in n-hexane for 48 hours to dissolve the rubber. Thus obtained short fibers were dried at a freezing temperature and dyed with osmium oxide. Then, they were embedded into polymethyl methacrylate and cut in a direction perpendicular to the extrusion direction to form a very thin slice. The diameters of short fibers contained in the slice were measured by an electron microscope and then the average diameter was calculated according to the following equation:

$$\bar{r} = \frac{\Sigma n_i \cdot r_i}{\Sigma n_i}$$

wherein r is an average diameter, ri is a diameter of short fiber, ni is a number of short fibers having a diameter of ri and $\Sigma$ ni is 300.

TABLE 1

| Compounding recipe (parts by weight) | Example | | | Comparative Example | |
|---|---|---|---|---|---|
| | 1 | 2 | 3 | 1 | 2 |
| Natural rubber | 70 | 70 | 70 | 70 | 70 |
| Polybutadiene rubber | 30 | 30 | 30 | 30 | 30 |
| Carbon black N-220 | 45 | 45 | 45 | 45 | 45 |
| Aromatic oil | 8 | 8 | 8 | 8 | 8 |
| Stearic acid | 2 | 2 | 2 | 2 | 2 |
| Zinc white | 3.5 | 3.5 | 3.5 | 3.5 | 3.5 |
| Nobs *1 | 0.8 | 0.8 | 0.8 | 0.8 | 0.8 |
| DM *2 | 0.3 | 0.3 | 0.3 | 0.3 | 0.3 |
| Sulfur | 1.75 | 1.75 | 1.75 | 1.75 | 1.75 |
| Syn-1,2-polybutadiene short fiber No. 1 | 10 | | | | |
| Syn-1,2-polybutadiene short fiber No. 2 | | 10 | | | |
| Syn-1,2-polybutadiene | | | 10 | | |

TABLE 1-continued

| Compounding recipe (parts by weight) | Example 1 | Example 2 | Example 3 | Comparative Example 1 | Comparative Example 2 |
|---|---|---|---|---|---|
| short fiber No. 3 Syn-1,2-polybutadiene short fiber No. 4 | | | | 10 | |
| Syn-1,2-polybutadiene short fiber No. 5 | | | | | 10 |
| Average diameter of short fibers ($\mu$) | 0.2 | 0.5 | 0.8 | 1.5 | 10.0 |
| Maximum diameter of short fibers ($\mu$) | 2.9 | 7.0 | 7.5 | 12 | 59 |
| Results | | | | | |
| Rebound resilience value (%) | 59 | 58 | 58 | 49 | 47 |
| Durability by drum (km/h) | 120 | 120 | 120 | 100 | 90 |
| Wear resistance index | 100 | 101 | 98 | 88 | 85 |

Note:
*1 : N-oxydiethylene-2-benzothiazylsulfenamide
*2 : dibenzothiazylsulfide

It can be seen from the above Table 1 that a vulcanizate of a rubber composition containing syn-1,2-polybutadiene short fibers having a maximum diameter of not more than 10$\mu$ and an average diameter of less than 1$\mu$ has a high rebound resilience value, and therefore a tire using the vulcanizate as the tread base rubber is excellent in the durability and further has a satisfactorily high wear resistance.

EXAMPLES 4–7 AND COMPARATIVE EXAMPLES 3–5

Various rubber compositions having a compounding recipe as shown in the following Table 2 were tested in the same manner as described in Example 1, and the obtained results are shown in Table 2.

It can be seen from Table 2 that, when the compounding amount of syn-1,2-polybutadiene short fibers is 3 to 40 parts by weight based on 100 parts by weight of rubber and the vulcanizate of the rubber composition has a rebound resilience value of at least 50%, the vulcanizate is remarkably excellent in the durability and wear resistance.

As described above, the pneumatic tire of the present invention is low in the heat build-up, and therefore the tire can be prevented from troubles due to heat build-up and further is remarkably excellent in the wear resistance at the end of the use.

What is claimed is:

1. A pneumatic tire having a cap/base structured tread and having an improved resistance against heat build-up, comprising a tread base rubber formed from a vulcanizate, which has a rebound resilience value of at least 50% defined in JIS K6301, of a rubber composition comprising 3 to 40 parts by weight of preformed short fibers of syndiotactic-1,2-polybutadiene having a maximum diameter of not more than 10$\mu$ and an average diameter of less than 1$\mu$, 20 to 100 parts by weight of carbon black and 0.2 to 2 parts by weight of sulfur, on a basis of 100 parts by weight of a rubber selected from natural rubbers, synthetic rubbers and blends thereof in an optional blending ratio.

2. A pneumatic tire as claimed in claim 1, wherein each of said short fibers of syndiotactic-1,2-polybutadiene has a 1,2-structure unit content of not less than 80%.

3. A pneumatic tire as claimed in claim 1, wherein each of said short fibers of syndiotactic-1,2-polybutadiene has a melting point of not less than 190° C.

4. A pneumatic tire as claimed in claim 1, wherein the amount of said short fibers of syndiotactic-1,2-polybutadiene is 5 to 20 parts by weight.

* * * * *

TABLE 2

| Compounding recipe (parts by weight) | Comparative example 3 | Example 4 | Example 5 | Example 6 | Exaple 7 | Comparative Example 4 | Comparative Example 5 |
|---|---|---|---|---|---|---|---|
| Natural rubber | 100 | 100 | 100 | 100 | 100 | 100 | 100 |
| Carbon black N-220 | 50 | 50 | 50 | 50 | 50 | 50 | 50 |
| Aromatic oil | 5 | 5 | 5 | 5 | 5 | 5 | 5 |
| Stearic acid | 2 | 2 | 2 | 2 | 2 | 2 | 2 |
| Zinc white | 3.5 | 3.5 | 3.5 | 3.5 | 3.5 | 3.5 | 3.5 |
| Nobs | 0.5 | 0.5 | 0.5 | 0.5 | 0.5 | 0.5 | 0.5 |
| Sulfur | 1.5 | 1.5 | 1.5 | 1.5 | 1.5 | 1.5 | 1.5 |
| Syn-1,2-polybutadiene short fiber No. 1 | 1 | 3 | 5 | 25 | 40 | 50 | 60 |
| Results | | | | | | | |
| Rebound resilience value (%) | 59 | 57 | 56 | 54 | 52 | 47 | Compounding is impossible |
| Durability by drum (km/h) | 120 | 120 | 120 | 110 | 100 | 70 | |
| Wear resistance index | 76 | 94 | 95 | 98 | 109 | 100 | |